US012803823B2

(12) United States Patent
Bok et al.

(10) Patent No.: US 12,803,823 B2
(45) Date of Patent: Nov. 17, 2026

(54) SYSTEMS AND METHODS FOR PROTECTING UNAUTHENTICATED COMPUTER APPLICATIONS

(71) Applicant: JPMORGAN CHASE BANK, N.A., New York, NY (US)

(72) Inventors: Reetu Raj Bok, Philadelphia, PA (US); Surendra Mohan, Melissa, TX (US); Ramesh R Dandela, Frisco, TX (US); Elizabeth Sarti, West Nyack, NY (US); Manoj Radhakrishnan Manoharan, Frisco, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 291 days.

(21) Appl. No.: 18/324,377

(22) Filed: May 26, 2023

(65) Prior Publication Data

US 2024/0396732 A1 Nov. 28, 2024

(51) Int. Cl.
*H04L 9/32* (2006.01)

(52) U.S. Cl.
CPC .... *H04L 9/3297* (2013.01); *G06F 2221/2117* (2013.01); *H04L 9/3213* (2013.01)

(58) Field of Classification Search
CPC ................. H04L 9/3213; H04L 9/3297; G06F 2221/2117
See application file for complete search history.

(56) References Cited

U.S. PATENT DOCUMENTS

2009/0271847 A1* 10/2009 Karjala ............... H04L 63/0807 726/6
2013/0254117 A1* 9/2013 Von Mueller ...... G06Q 20/3829 705/71
2015/0193600 A1* 7/2015 Matsuda ............ H04L 63/0823 726/9
2016/0308851 A1* 10/2016 Tiwari .................. H04L 63/126
(Continued)

OTHER PUBLICATIONS

Spielman "Best Practices When Using JWTs with Web and Mobile Apps." Duende Software, Sep. 30, 2025 [retrieved on Aug. 18, 2026]. Retrieved from the Internet: <URL: https://duendesoftware.com/learn/best-practices-using-jwts-with-web-and-mobile-apps> (Year: 2025).*

*Primary Examiner* — Zhe Liu
(74) *Attorney, Agent, or Firm* — GREENBERG TRAURIG LLP

(57) ABSTRACT

Systems and methods for protecting unauthenticated computer applications are disclosed. A method may include: enrolling, by a computer program executed by a client backend and with a host backend, the client backend to access a service provided by the host backend; creating, by the host backend computer program, a database entry in a database that stores a client backend identifier for the client backend, an identifier for the service, and a time period for the access; receiving, by the client application executed on a user mobile device, user information; calling, by the client application, the host backend computer program with an application identifier for the client application; generating, by the host backend computer program, a security token; and
(Continued)

sending, by the host backend computer program, the security token to the client backend, wherein the client backend may be configured to send the security token to the client application.

13 Claims, 5 Drawing Sheets

(56) References Cited

U.S. PATENT DOCUMENTS

| | | | | |
|---|---|---|---|---|
| 2017/0099281 | A1* | 4/2017 | Trevathan | G06F 16/86 |
| 2017/0364911 | A1* | 12/2017 | Landrok | G06Q 20/385 |
| 2018/0350177 | A1* | 12/2018 | Dautz | G06Q 20/325 |
| 2020/0236113 | A1* | 7/2020 | Monica | H04L 9/50 |
| 2021/0243040 | A1* | 8/2021 | Lu | G06F 16/245 |
| 2022/0014357 | A1* | 1/2022 | Jones | H04L 9/14 |
| 2023/0018767 | A1* | 1/2023 | Singh | H04L 63/068 |
| 2023/0132934 | A1* | 5/2023 | Wilson | H04L 63/0807 726/6 |
| 2023/0163967 | A1* | 5/2023 | Cannata, Jr. | H04L 9/3263 713/156 |
| 2023/0299958 | A1* | 9/2023 | Baibik | H04L 9/40 713/159 |
| 2024/0022561 | A1* | 1/2024 | Ingram | H04L 63/08 |
| 2024/0305477 | A1* | 9/2024 | Breitner | H04L 9/0866 |
| 2024/0340275 | A1* | 10/2024 | Levy | H04L 63/102 |
| 2024/0380748 | A1* | 11/2024 | Yao | G06F 21/6218 |
| 2025/0005664 | A1* | 1/2025 | Koenigsknecht | H04L 9/3247 |

* cited by examiner

SYSTEMS AND METHODS FOR PROTECTING UNAUTHENTICATED COMPUTER APPLICATIONS

BACKGROUND OF THE INVENTION

1. Field of the Invention

Embodiments generally relate to systems and methods for protecting unauthenticated computer applications.

2. Description of the Related Art

Certain use cases require an organization to expose unauthenticated uniform resource locators, or URLs, to the public. This means that anyone can access these URLs-no login credentials are needed to access these URLs. Thus, applications at these URLs are subject to malicious attackers that may send requests to waste the resource of the application.

SUMMARY OF THE INVENTION

Systems and methods for protecting unauthenticated computer applications are disclosed. In one embodiment, a method for protecting unauthenticated computer applications may include: (1) enrolling, by a computer program executed by a client backend and with a host backend, the client backend to access a service provided by the host backend; (2) creating, by the host backend computer program, a database entry in a database that stores a client backend identifier for the client backend, an identifier for the service, and a time period for the access; (3) receiving, by the client application executed on a user mobile device, user information; (4) calling, by the client application, the host backend computer program with an application identifier for the client application; (5) generating, by the host backend computer program, a security token; and (6) sending, by the host backend computer program, the security token to the client backend, wherein the client backend may be configured to send the security token to the client application.

In one embodiment, the method may also include: retrieving, by the host backend computer program, a signing key from a key management service; signing, by the host backend computer program, the security token with the signing key; associating, the host backend computer program, the signed security token with the database entry for the client backend; and storing, by the host backend computer program, the association in the database. The host backend computer sends the signed security to the client backend, wherein the client backend may be configured to send the signed security token to the client application.

In one embodiment, the security token may have a length of less than a predetermined length.

In one embodiment, the method may also include: retrieving, by the host backend computer program, an encryption key and a signing key from a key management service; encrypting, by the host backend computer program, the security token; signing, by the host backend computer program, the security token with the signing key; and signing, by the host backend computer program, the encrypted security token with the signing key. The host backend computer sends the signed security token and the signed encrypted security token to the client backend, wherein the client backend may be configured to send the signed security token and the signed encrypted security token to the client application.

In one embodiment, the host backend computer program sends a Uniform Resource Locator (URL) with the security token to the client backend, wherein the client backend may be configured to send the security token and the URL to the client application.

In one embodiment, the security token may include a JSON Web Token (JWT).

In one embodiment, the security token may include the client backend identifier, the identifier for the service, and the time period for the access.

In one embodiment, the database entry further identifies a limit on a number of times that the service is accessed by the client application.

According to another embodiment, a method for providing unauthenticated computer applications with token-based access to services may include: (1) receiving, at a host backend computer program for a host user interface, a security token and a request for access to a service; (2) determining, by the host backend computer program, that the security token is not encrypted; (3) identifying, by the host backend computer program, a database entry corresponding to the security token in a database, wherein the database entry may include a client backend identifier for a client backend, an identifier for the service, and a time period for the access; (4) determining, by the host backend computer program, that a current time is within the time period in the database entry; and (5) granting, by the host backend computer program, the host user interface with access to the service.

In one embodiment, the method may also include validating, by the host backend computer program, that the client backend identifier for the client backend is valid.

In one embodiment, the security token may include a JSON Web Token (JWT).

In one embodiment, the security token may include the client backend identifier, the identifier for the service, and the time period for the access.

In one embodiment, the method may also include determining, by the host backend computer program, that the access is not above a limit on a number of times that the service is accessed by the client application identified in the database entry.

According to another embodiment, a method for providing unauthenticated computer applications with token-based access to services may include: (1) receiving, at a host backend computer program for a host user interface, a security token and a request for access to a service; (2) determining, by the host backend computer program, that the security token is encrypted; (3) retrieving, by the host backend computer program, an encryption key from a key management service; (4) decrypting, by the host backend computer program, the security token using the encryption key, wherein the decrypted security token may include a client backend identifier for a client backend, an identifier for the service, and a time period for the access; (5) determining, by the host backend computer program, that the time period is valid; and (6) granting, by the host backend computer program, the host user interface with access to the service.

In one embodiment, the security token may be received with a signed encrypted security token, and further comprising: retrieving, by the host backend computer program, a signing key from the key management service; and verifying, by the host backend computer program, a signature on the signed encryption security token.

In one embodiment, the method may also include validating, by the host backend computer program, that the client backend identifier for the client backend is valid.

In one embodiment, the security token may include a JSON Web Token (JWT).

In one embodiment, the decrypted security token further may include a limit on a number of times that the service is accessed, and the method may also include determining, by the host backend computer program, that the access is not above the limit on the number of times that the service is accessed.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
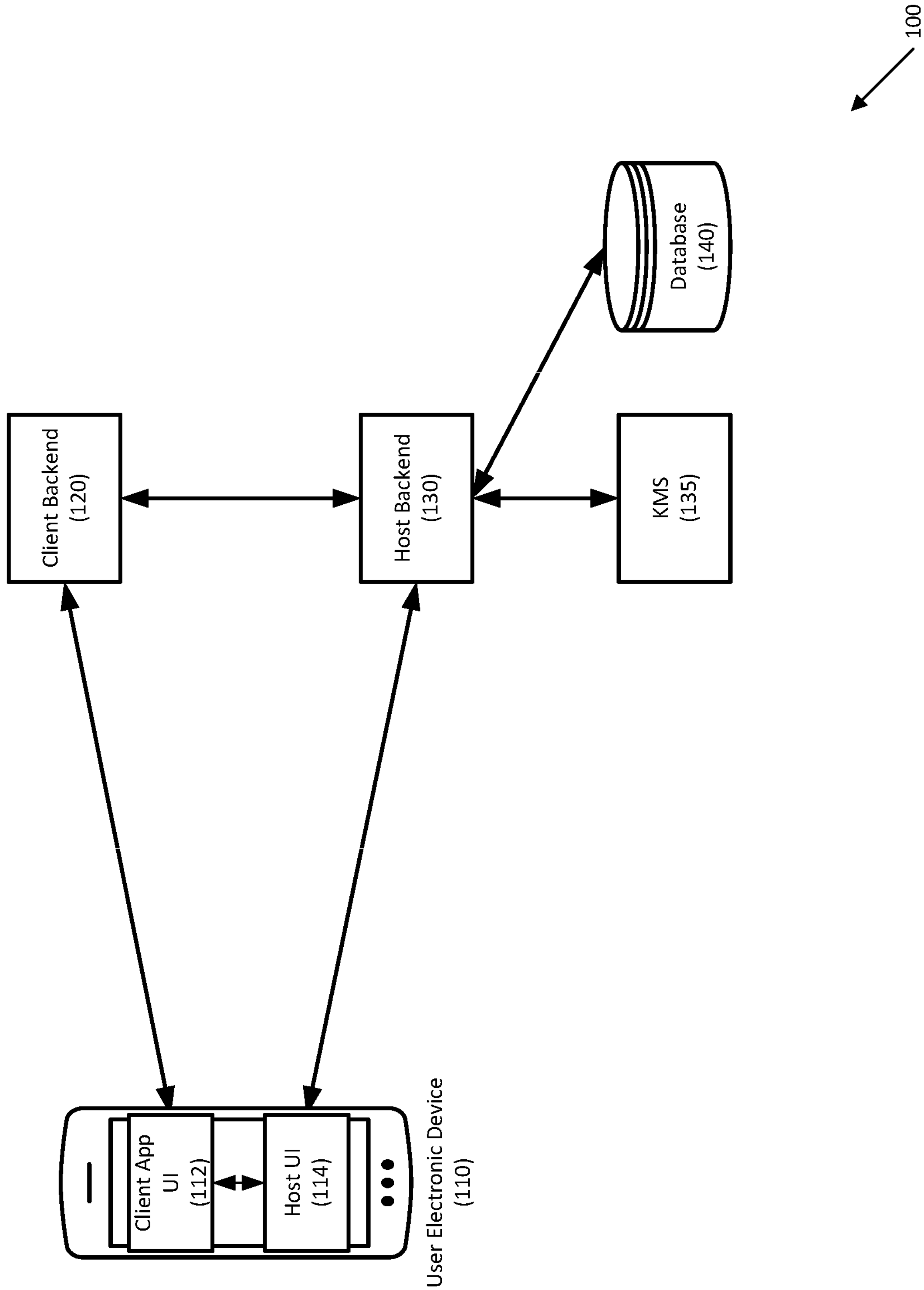
FIG. 1 depicts a system for protecting unauthenticated computer applications according to an embodiment.

Embodiments are directed to systems and methods for protecting unauthenticated computer applications.

In embodiments, a client backend may be responsible for initiating a user journey. The client backend may invoke a host backend, which is responsible for processing certain data submitted during user journey and notifying the client backend of the results. The host backend may be hosted on a public URL, and no authentication is required to access its URL. An encrypted security token, such as an encrypted JSON Web Token (JWT), may be required in order to access processing of data by the host backend.

The host backend may perform two functions. A first function may include the generation of the JWT, which may create the encrypted JWT based on parameters such as an application identifier and a "validfor" indicator that may be received from the client backend. These parameters may be unique for each user journey and use case.

The second function may maintain the valid application ID in a database or a cache depending on volume and latency requirement of the application. A counter and a timestamp may also be maintained, with the counter representing how many times the host backend may be invoked for a given application ID (e.g., ten times).

The timestamp and time may represent for how long the host backend may be invoked. For example, for a given application ID, the host backend may be invoked anytime within 24 hours from the timestamp.

Once the data is processed by the host backend, the given application ID may be deleted from the database or cache.

In the verification process, the unique JWT may be provided by the host backend to the client backend. For example, the JWT may be provided as an encrypted JWT or as a hash, such as a SHA2, of the JWT. Both JWTs may include additional attributes, such as an expiration, a counter, etc. Examples of JWT configurations are as follows: (1) encrypted JWT with expiration and counter; (2) encrypted JWT with just expiration; (3) encrypted JWT with just counter; (4) hash of the JWT with expiration and counter; (5) hash of the JWT with just expiration; and (6) hash of the JWT with just counter.

An example of an encrypted JWT URL is: https://docval.entity.com/something?jwt=GU6vHj5u8FAeHC3bO2IAtN8jtWc5YaVILYv1BCryO2RSBIgy0vx2a4lj/KfP3bgvYBpoRIhH7BC2ysYx3cZrJ86DfjZIKhM0THMI38A7qRkM8Mie6NvIbw/tuX4c oyfS.

An example of a tiny JWT URL is https://docval.entity-.com/something?jwt=KfP3bgvYBpoRIhH7BC2ysYx3cZrJ86DfjZIKh.

The encrypted JWT URL may be unique for every request for the host backend. The encrypted JWT URL, when opened in a browser, may load the host backend, and the encrypted JWT URL may be loaded either by a URL redirect from the client application, or the user may receive the encrypted JWT URL in an email or a text message as a link or QR Code, and may click on the link to open the URL and load the host backend.

Once the host backend is loaded in the browser, the user may submit data to the host backend with an API request along with the encrypted JWT in the request header. The host backend verifies the encrypted JWT and may then provide the data to a requested service and return a response.

Referring to FIG. 1, a system for protecting unauthenticated computer applications is disclosed according to an embodiment. System 100 may include user electronic device 110, which may be a computer (e.g., workstation, desktop, laptop, notebook, tablet, etc.), a smart device (e.g., smart phone, smart watch, etc.), Internet of Things (IoT) appliances, etc.

User electronic device 110 may execute computer programs or applications, including client application (app) user interface 112 and host app user interface 114, etc. Client app user interface 112 may be provided by a client, such as a financial institution, a merchant, a service provider, etc. and may interface with client backend 120. Client backend 120 may access host backend 130 to provide support for service that may be provided by host backend 130, such as services used during onboarding of a new user.

Host backend 130 may be accessed using an application programming interface (API) as an open URL.

Client backend 120 and host backend 130 may include webservers, services, may expose APIs, etc.

System 100 may also include key management service (KMS) 135 that may manage encryption and decryption keys for encrypting and decryption of the JWT.

Host backend 130 may store information regarding the security token in database 140. Database 140 may also store access information for client app user interface 112, such as an application identifier for client app user interface 112, a number of accesses by client app user interface 112, timestamps, etc.

Figure 2A:
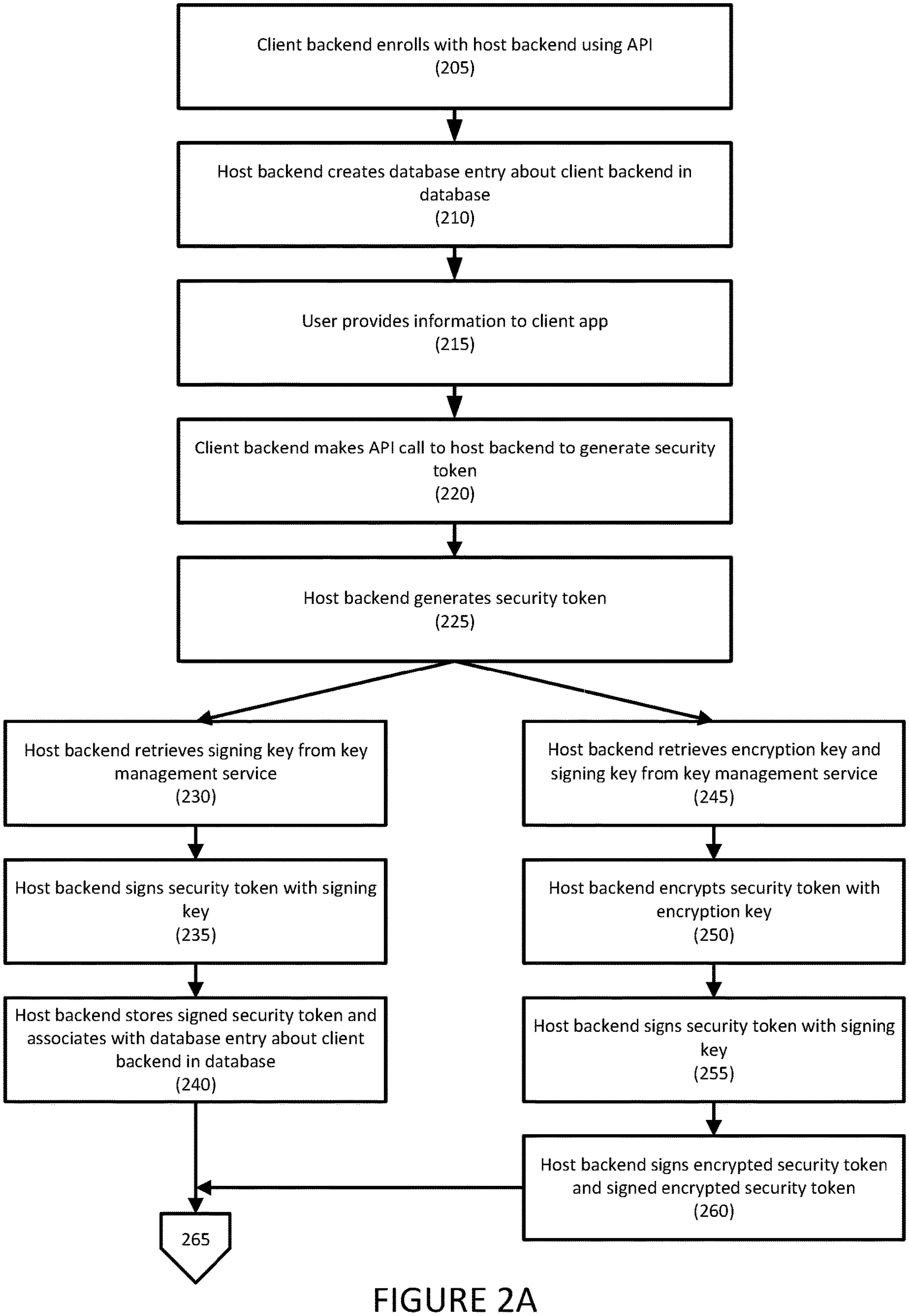
FIGS. 2A and 2B depict a method for enrolling a client to protect unauthenticated computer applications according to an embodiment.
Figure 2B:
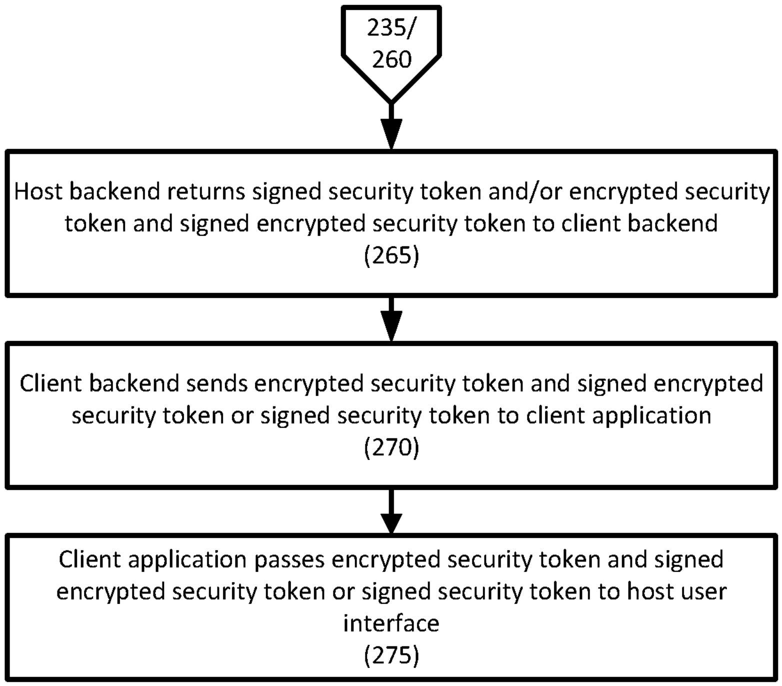

Referring to FIGS. 2A and 2B, a method for enrolling a client to protect unauthenticated computer applications is disclosed according to an embodiment.

In step 205, a computer program executed by a client backend may enroll with a host backend to use a host service provided by the host backend. In one embodiment, the client backend may provide, for example, a client backend identifier, a client app user interface identifier, a trace identifier, an end user alias identifier, an expiration period for a security token, and/or an identifier for the requested resource.

In step 210, the host backend may create a database entry in a database that stores, for example, the client backend identifier, the client app user interface identifier, the trace identifier, the end user alias identifier, the expiration period for a security token, and/or the identifier for the requested resource.

In one embodiment, the enrollment may be for a plurality of users, such as potential customers of the client.

In step 215, a user may provide information to a client application user interface, such as a browser, etc. executed by a user electronic device. The information may include, for example, personal identifiable information. The client application may provide the information to the client backend.

In step 220, the client backend may make a call, such as an API call, to the host backend to request the generation of a security token. The call may include, for example, the client backend identifier and a client application user interface identifier for the client application user interface. In one embodiment, if necessary, the call may further identify a period for which the security token generated by the host backend is to be valid, a number of times that the client application may access the host backend, etc.

In step 225, the host backend may generate the security token for the client backend. In one embodiment, the security token may be a JWT token. In one embodiment, the security token may include, for example, the client backend identifier, the client app user interface identifier, the trace identifier, the end user alias identifier, the expiration period for a security token, and/or the identifier for the requested resource.

The host backend may either encrypt the security token with an encryption key and then sign the encrypted security token with a signing key, it may sign the security token with a signing key. The path taken may depend on the length of the encrypted security token. For example, if encrypting the security token makes a URL length greater than a certain number of characters (e.g., 2048 characters), in step 230, the host backend may retrieve a suitable signing key from a key management service, and in step 235, may sign the security key.

In step 240, the host backend may store the signed security token and may associate the signed security token with the database entry about client backend (e.g., the client app user interface identifier, the application identifier, a timestamp, and the valid for time for the security token) in the database.

Alternatively, if encrypting the security token results in a URL length of less than the certain number of characters, or if the length is not an issue, in step 245, the host backend may retrieve an encryption key and a signing key from the key management service, and in step 250, may encrypt the security token using the encryption key. In step 255, the host backend may then sign the encrypted security token using the signing key.

In step 260, the host backend may send the security token or the hash of the security token, and the URL, to the client backend, which, in step 255, may send the security token or hash of the security token, and the URL, to a client user interface or a client application. Before sending the security token or the hash of the security token, the host backend may optionally store the security token or hash of the security token in a database associated with the host backend.

In step 265, the host backend may return the signed security token and/or the encrypted security token and the signed encrypted security token to client backend. In step 270, the client backend may send the encrypted security token and the signed encrypted security token or the signed security token to a client user interface at the client application, which, in step 275, may pass the encrypted security token and the signed encrypted security token or the signed security token to the host user interface.

Figure 3:
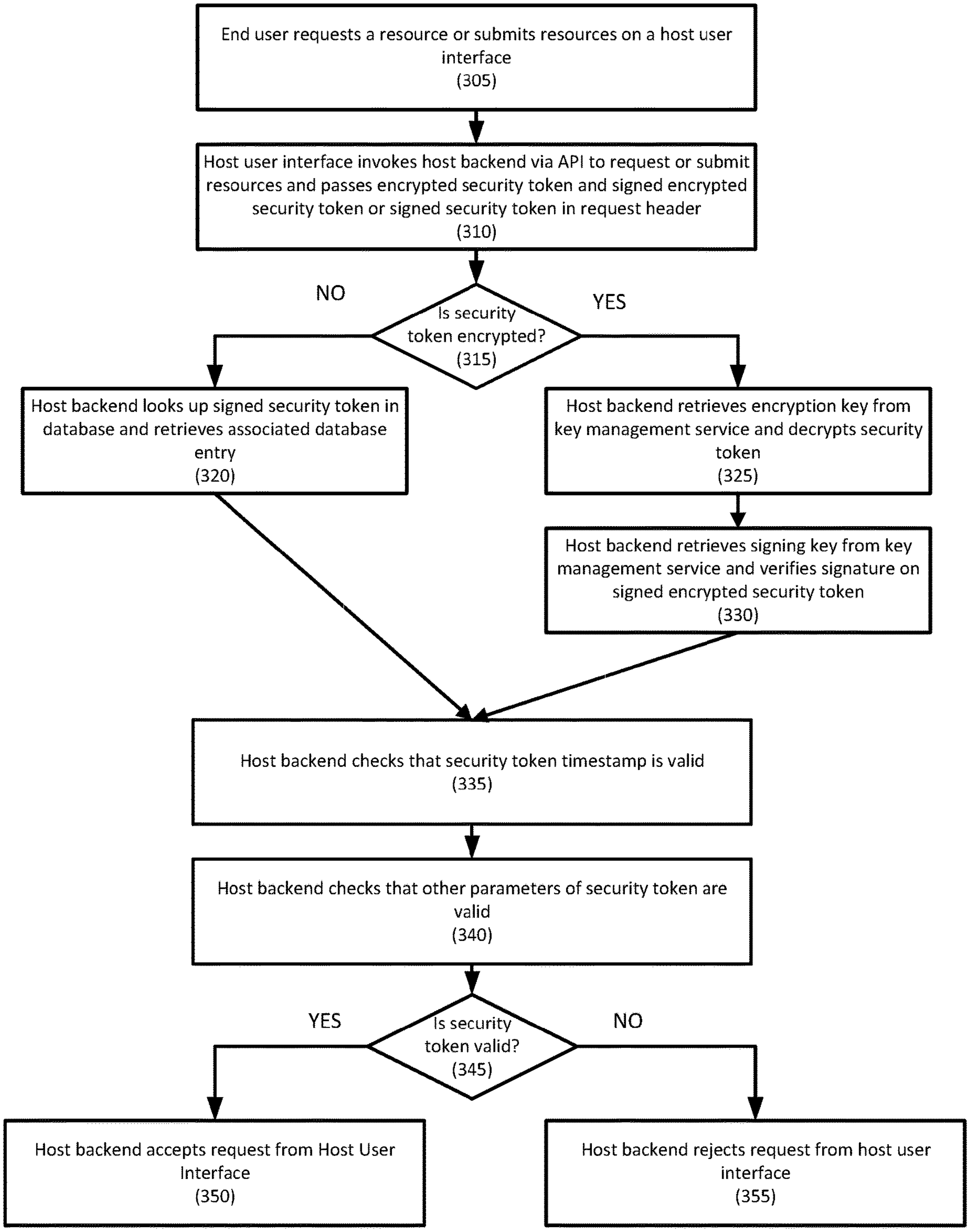
FIG. 3 depicts a method for protecting unauthenticated computer applications according to one embodiment.

Referring to FIG. 3, a method for protecting unauthenticated computer applications is disclosed according to one embodiment.

In step 305, after receiving the encrypted security token and the signed encrypted security token or the signed security token and URL, using a host user interface, an end user may request a response or submit resources.

In step 310, the host user interface may invoke host backend via API to request or submit resources and may pass the encrypted security token and the signed encrypted security token or the signed security token.

In step 315, the host backend may check to see if the security token is encrypted. If it is not, indicating that the security token is assigned with a signing key, in step 320, the host backend may look up the database entry associated with the signed security token and may retrieve, for example, the client backend identifier, the client app user interface identifier, the trace identifier, the end user alias identifier, the expiration period for a security token, and/or the identifier for the requested resource.

If the host backend determines that the security token is encrypted, in step 325, the host backend may retrieve an encryption key from the key management service and may use the key to decrypt the encrypted security token. It may then extract the client backend identifier, the client app user interface identifier, the trace identifier, the end user alias identifier, the expiration period for a security token, and/or the identifier for the requested resource from the decrypted security token.

In step 330, the host backend may verify the signature of the signed encrypted security token by retrieving a signing key from the key management service and using the signing key to verify the signature.

In step 335, the host backend may verify that the security token timestamp is valid. It may also verify that the count of times that the client application has accessed the host backend does not exceed the count.

In step 340, the host backend may verify that some or all of the other parameters are valid. For example, it may compare the retrieved client backend identifier, the client app user interface identifier, the trace identifier, the end user alias identifier, the expiration period for a security token, and/or the identifier for the requested resource to the actual client backend identifier, the client app user interface identifier, the trace identifier, the end user alias identifier, the expiration period for a security token, and/or the identifier.

If, in step 345, the checks are all valid, in step 350, the host backend may accept the request from the host user interface and may make the resource available.

If the checks are not all valid, in step 355, the host backend may reject the request from the host user interface and may not make the resource available. The host backend may return an error to the host user interface.

Figure 4:
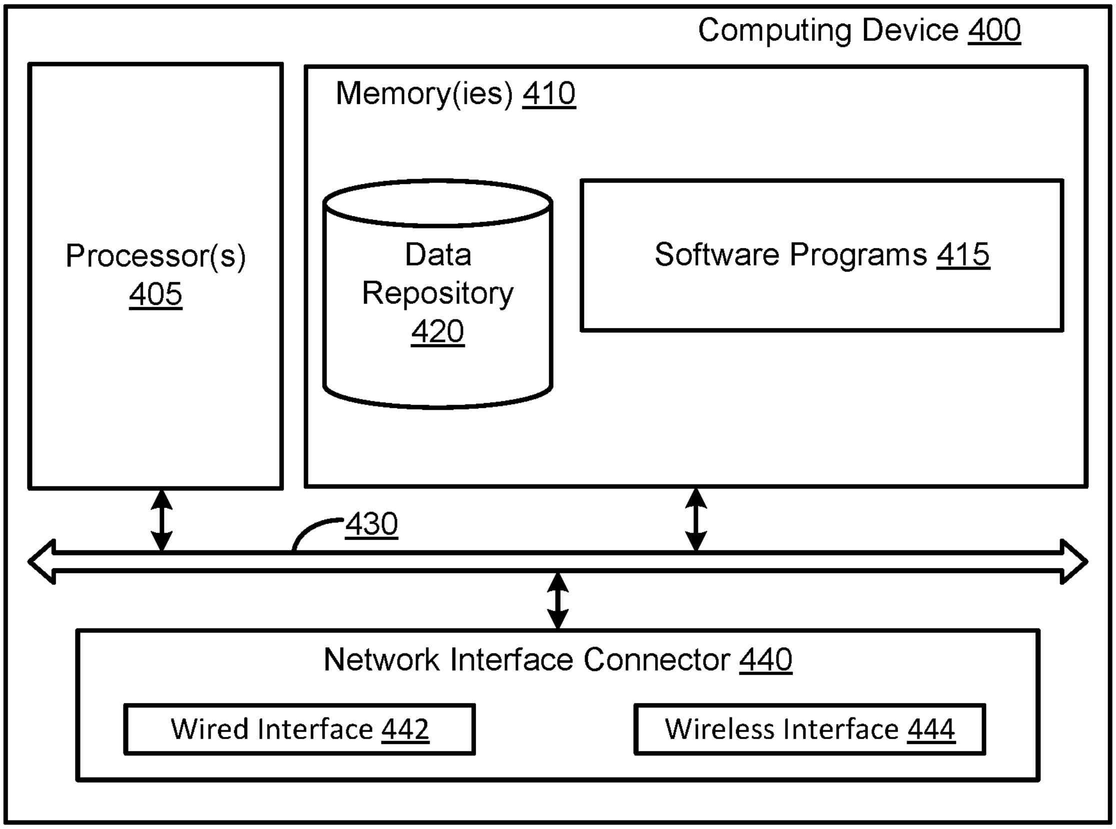
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for enrolling a client to protect unauthenticated computer applications, comprising:

enrolling, by a computer program executed by a client backend for a client application and with a host backend computer program, a client application identifier for the client application to access a service provided by a host backend;

creating, by the host backend computer program, a database entry in a database that stores a client backend identifier for the client backend, an identifier for the service, the client application identifier, and an expiration for the access;

receiving, by the client application executed on a user mobile device, user information;

calling, by the client application, the host backend computer program with the client application identifier;

generating, by the host backend computer program, an access token comprising the client backend identifier, the identifier for the service, and the expiration for the access, wherein the access token comprises a JSON Web Token (JWT); and sending, by the host backend computer program, the access token to the client backend, wherein the client backend is configured to send the access token to the client application.

2. The method of claim 1, further comprising:

retrieving, by the host backend computer program, a signing key from a key management service;

signing, by the host backend computer program, the access token with the signing key;

associating, the host backend computer program, the signed access token with the database entry for the client backend; and storing, by the host backend computer program, the association in the database;

wherein the host backend computer sends the signed access token to the client backend, wherein the client backend is configured to send the signed access token to the client application.

3. The method of claim 2, wherein the signed access token has a length of less than a predetermined length.

4. The method of claim 1, further comprising:

retrieving, by the host backend computer program, an encryption key and a signing key from a key management service;

encrypting, by the host backend computer program, the access token;

signing, by the host backend computer program, the access token with the signing key; and signing, by the host backend computer program, the encrypted access token with the signing key;

wherein the host backend computer sends the signed access token and the signed encrypted access token to the client backend, wherein the client backend is configured to send the signed access token and the signed encrypted access token to the client application.

5. The method of claim 1, wherein the host backend computer program sends a Uniform Resource Locator (URL) with the access token to the client backend, wherein the client backend is configured to send the access token and the URL to the client application.

6. The method of claim 1, wherein the database entry further identifies a limit on a number of times that the service is accessed by the client application.

7. The method of claim 1, further comprising:

receiving, at the host backend computer program, the access token and a request for access to the service, wherein the access token is provided in a header for the request;

determining, by the host backend computer program, that the access token is not encrypted;

identifying, by the host backend computer program, the database entry corresponding to the access token in the database;

determining, by the host backend computer program, that a current time is within the expiration in the database entry; and granting, by the host backend computer program, access to the service.

8. The method of claim 7, further comprising:

validating, by the host backend computer program, that the client backend identifier for the client backend is valid.

9. The method of claim 7, further comprising:

determining, by the host backend computer program, that the access is not above a limit on a number of times that the service is accessed by the client application identified in the database entry.

10. The method of claim 1, further comprising:

receiving, at the host backend computer program, the access token and a request for access to the service, wherein the access token is provided in a header for the request;

determining, by the host backend computer program, that the access token is encrypted;

retrieving, by the host backend computer program, an encryption key from a key management service;

decrypting, by the host backend computer program, the access token using the encryption key;

determining, by the host backend computer program, that the access token has not expired based on the expiration; and granting, by the host backend computer program, access to the service.

11. The method of claim 10, wherein the access token is received with a signed encrypted access token, and further comprising:

retrieving, by the host backend computer program, a signing key from the key management service; and verifying, by the host backend computer program, a signature on the signed encrypted access token.

12. The method of claim 10, further comprising:

validating, by the host backend computer program, that the client backend identifier for the client backend is valid.

13. The method of claim 10, wherein the decrypted access token further comprises a limit on a number of times that the service is accessed, and further comprising determining, by the host backend computer program, that the access is not above the limit on the number of times that the service is accessed.

* * * * *